United States Patent [19]

Makibayashi et al.

[11] Patent Number: 4,721,291
[45] Date of Patent: Jan. 26, 1988

[54] VIBRATION-PREVENTING RUBBER DEVICE

[75] Inventors: Katsunori Makibayashi, Toyota; Kenji Murase, Suzuka; Motoo Kunihiro, Tsu, all of Japan

[73] Assignees: Toyota Jidosha Kabushiki Kaisha, Aichi; Toyo Tire & Rubber Co., Ltd., Osaka, both of Japan

[21] Appl. No.: 882,140

[22] Filed: Jul. 3, 1986

[30] Foreign Application Priority Data

Jul. 5, 1985 [JP] Japan ................ 60-146579

[51] Int. Cl.⁴ .................................... F16F 5/00
[52] U.S. Cl. .................... 267/140.1; 248/636; 267/33; 267/141.1
[58] Field of Search ............. 267/140.1, 140.3, 140.4, 267/140.5, 8 R, 33, 35, 141, 141.1, 141.3, 141.4, 141.5; 248/636, 638, 562; 180/291, 312

[56] References Cited

U.S. PATENT DOCUMENTS

| | | | |
|---|---|---|---|
| 2,421,585 | 6/1947 | Thiry | 267/140.1 |
| 2,540,130 | 2/1951 | Lee | 248/562 |
| 2,555,347 | 6/1951 | Lee | 56/129 |
| 2,562,195 | 7/1951 | Lee | 267/140.1 |
| 2,600,090 | 6/1952 | Barber et al. | 267/140.1 |
| 3,154,273 | 10/1964 | Paulsen | 267/134 |
| 3,698,703 | 10/1972 | Hipsher | 267/63 R |
| 4,161,304 | 7/1979 | Brenner et al. | 267/35 |
| 4,377,216 | 3/1983 | Ueno | 248/562 |
| 4,460,168 | 7/1984 | Obadal | 267/8 R |
| 4,572,488 | 2/1986 | Holmberg, Jr. et al. | 267/8 R |
| 4,573,656 | 3/1986 | Yoshida et al. | 248/562 |
| 4,611,782 | 9/1986 | Ushijima et al. | 248/562 |

FOREIGN PATENT DOCUMENTS

| | | |
|---|---|---|
| 37348 | 2/1984 | Japan . |
| 231236 | 12/1984 | Japan . |
| 1433772 | 4/1976 | United Kingdom . |
| 2041485 | 9/1980 | United Kingdom . |

*Primary Examiner*—George E. A. Halvosa
*Assistant Examiner*—Matthew C. Graham
*Attorney, Agent, or Firm*—Parkhurst & Oliff

[57] ABSTRACT

This invention relates to a multiple mounting vibration-preventing device wherein a partition wall is interposed between an upper plate and a lower plate. An upper vibration-preventing rubber member is interposed between the partition wall and the upper plate so as to define an upper damper liquid chamber therebetween. A lower vibration-preventing rubber member is interposed between the partition wall and the lower plate so as to define a lower damper liquid chamber therebetween. The upper damper liquid chamber communicates with the lower damper liquid chamber through an orifice. Either or both the upper damper liquid chamber and the lower damper liquid chamber is horizontally divided into a plurality of damper liquid subchambers by division plates extending in the vertical direction of the damper liquid chambers. Adjacent damper liquid subchambers communicate through orifices provided in the division plates.

6 Claims, 5 Drawing Figures

PRIOR ART

VIBRATION-PREVENTING RUBBER DEVICE

BACKGROUND OF THE INVENTION

Field of the Invention

This invention relates to a mounting cushion which is used when a heavy article such as cabin is placed and fixed on, for example, the frame of an automobile.

When the body of a cabin or the like is placed and fixed on the frame of an automobile, vibration-preventing rubber devices are interposed between the frame and the body so as to absorb and dampen vibrations. Thus, vibrations transmitted from tires to the frame during operation of the automobile may be prevented from propagating to the body.

In general, vibrations originating during the operation of vehicles have high and medium frequencies. Therefore, vibration-preventing devices having comparatively small spring constants are usually used to prevent vibrations. Such vibration-preventing devices, however, do not satisfactorily dampen vibrations in a low-frequency region, such as, for example, vibrations attributable to undulations of the surface of a bad road.

Multiple mounting type vibration-preventing devices have been developed which not only absorb high- and medium-frequency vibrations but also dampen low-frequency vibrations.

As shown in FIG. 5, a multiple mounting vibration-preventing device 1 includes, for example, an upper plate 2, connected to a lower plate 4, by an inner cylinder 3. A partition wall 6, having a hub 5, fitted outside the inner cylinder 3, is interposed between the upper plate 2 and the lower plate 4.

An upper vibration-preventing rubber member 7, in the shape of a ring, is interposed between the partition wall 6 and the upper plate 2. An upper elastic film 8 is sealingly fixed inside the upper vibration-preventing rubber member 7 such that the lower end thereof is spliced to the hub 5 of the partition wall 6. The upper outer end of the upper elastic film 8 is sandwiched between the upper end of the upper vibration-preventing rubber member 7 and the upper plate 2. The outer end of the upper plate 2 is caulked. This structure defines an upper damper liquid chamber 9.

A lower damper liquid chamber 12 is defined as follows. A lower vibration-preventing rubber member 10, in the shape of a ring, is interposed between the partition wall 6 and the lower plate 4. A lower elastic film 11 is sealingly fixed inside the lower vibration-preventing rubber member 10. The upper end of the lower vibration-preventing rubber member 10 is spliced to the hub 5 of the partition wall 6, and the lower outer end thereof is sandwiched between the lower end of the lower vibration-preventing rubber member 10 and the lower plate 4. The outer end of the lower plate 4 is caulked.

The upper damper liquid chamber 9 and the lower damper liquid chamber 12 communicate through an orifice 13 provided in the partition wall 6. A damper liquid, which is a noncompressible fluid such as coolant, is tightly sealed in the chambers.

Outer peripheral parts of the partition wall 6 of the vibration-preventing rubber device 1 are clamped to the frame 14 of a vehicle by bolts and nuts. The body 15 of, for example, a cabin placed on the upper plate 2, is fixed by a bolt 16, inserted through the inner cylinder 3, and a nut 17. High-frequency and medium-frequency vibrations arising in the frame 14 during operation of the vehicle are absorbed by the vibration-preventing members 7 and 10, while low-frequency vibrations are dampened by flow of the damper liquid through the orifice 13 communicating the damper liquid chambers 9 and 12. Thus, the vibrations from the relative up and down motion of the partition wall 6 and the inner cylinder 3 are attenuated under the damping action of the orifice 13.

The relationship between a frequency corresponding to a peak damping coefficient, namely, the resonance frequency $f_n$ of the damper liquid within the orifice 13, the volume modulus $k_1$ of the upper damper liquid chamber 9, the volume modulus $k_2$ of the lower damper liquid chamber 12, the aperture area S of the orifice 13, the length l of the orifice 13, and the specific gravity $\rho$ of the damper liquid, is as follows:

$$f_n \sqrt{S(k_1 + k_2/l\rho)}$$

That is, the resonance frequency $f_n$ of the damper liquid may be lowered by reducing the aperture area S of the orifice 13, lowering the volume moduli $k_1$ and $k_2$ of the respective damper liquid chambers 9 and 12, or increasing the length l of the orifice 13.

Regarding the relative vertical vibrations of the frame 14 of the vehicle and the body 15, the respective vibration-preventing rubber members 7 and 10 can reliably absorb the high-frequency and medium-frequency vibrations, and the damper liquid can reliably dampen the vibrations of the low-frequency region.

The vibration-preventing rubber members 7 and 10 can also absorb the high-frequency and medium-frequency vibrations from the shearing forces of relative horizontal vibrations of the frame 14 and the body 15. However, the prior art structure is disadvantageous in that the damping function of the damper liquid for the low-frequency vibrations is not satisfactory.

With regard to the relative horizontal vibrations of the frame 14 and the body 15, vibration-preventing rubber members 7 and 10 absorb high-frequency and medium-frequency vibrations from the shearing forces of the body and frame. The prior art devices are disadvantageous in that the damping function of the damper liquid for the low-frequency vibrations is not satisfactory.

SUMMARY OF THE INVENTION

This invention was developed in view of the foregoing background and to overcome the foregoing drawbacks.

It is accordingly an object of this invention to provide a vibration-preventing rubber device which satisfactorily absorbs and dampens, not only relative vertical vibrations, but also relative horizontal vibrations of the frame of a vehicle and the body of a cabin or the like, so as to enhance riding comfort and reduce noise.

These objects are achieved by providing a vibration-preventing device which includes an inner cylinder connected to an upper plate and a lower plate. A partition wall is provided outside of the inner cylinder between the upper plate and lower plate. An upper vibration preventing rubber member and an upper elastic film are provided outside of the inner cylinder between the partition wall and the upper plate. An upper damper liquid chamber is defined by at least the upper vibration-preventing rubber member and the upper elastic film.

Preferably, the partition wall also cooperates to define the upper damper liquid chamber.

Similarly, a lower vibration preventing rubber member and a lower elastic film are provided outside of the cylinder between the partition wall and the lower plate. A lower damper liquid chamber is defined at least by the lower elastic film and lower vibration preventing rubber member, and preferably also by the partition wall. The lower and upper damper liquid chambers communicate through an orifice.

BRIEF DESCRIPTION OF THE DRAWINGS

The above objects, features and advantages of the present invention will become more apparent from the description of the invention which follows, taken in conjunction with the accompanying drawing, wherein like reference numerals denote like elements, and wherein.

DETAILED DESCRIPTION OF THE PREFERRED EMBODIMENT

The present invention will be described in detail with reference to the accompanying drawings which illustrate a preferred embodiment according to the present invention.

Figure 1:
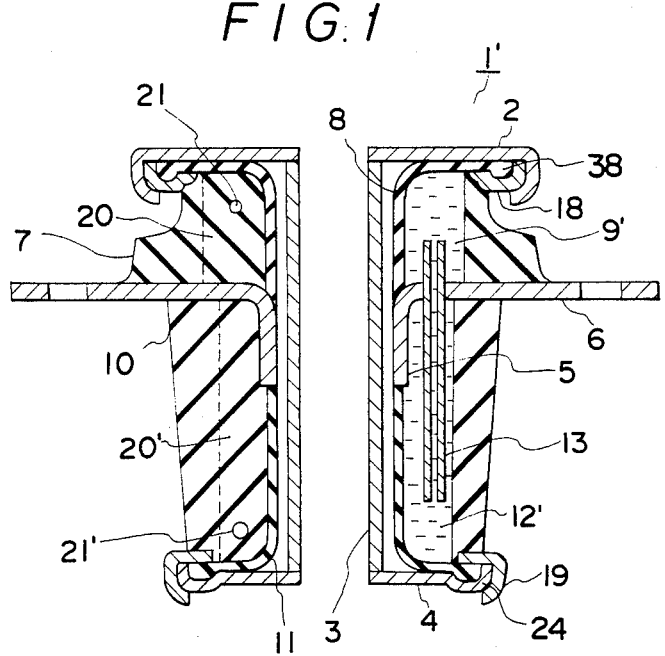
FIG. 1 is a vertical cross-sectional view of a vibration-preventing device according to one embodiment of this invention.

Referring to FIG. 1, symbol 1' denotes a vibration-preventing rubber device according to one embodiment of this invention. This embodiment is used, for example, when the cabin of a truck is placed and fixed on the frame thereof. In the vibration-preventing rubber device 1', an upper plate 2 having an outer end which is substantially L-shaped in vertical cross-section is connected through an inner cylinder 3 to a lower plate 4 having an outer end recess which is substantially U-shaped in vertical cross-section.

A partition wall 6 having a hub 5, which is fitted outside the inner cylinder 3, is interposed between the upper plate 2 and the lower plate 4. An upper vibration-preventing rubber member 7, which is in the shape of a ring and which is provided at its upper end with a fixture 18 substantially U-shaped in vertical section, is interposed between the partition wall 6 and the upper plate 2. An upper elastic film 8 is sealingly fixed inside the upper vibration-preventing rubber member 7. The lower end of the upper elastic film 8 is vulcanized and spliced to the upper part of the hub 5 of the partition wall 6, while the upper outer end thereof is sandwiched between the fixture 18 of the upper vibration-preventing rubber member 7 and the upper plate 2. The L-shaped outer end of the upper plate 2 is caulked.

A lower vibration-preventing rubber member 10, which is in the shape of a ring and which is provided at its lower end with a fixture 19 having an inverted-L-shape vertical cross-section, is interposed between the lower plate 4 and the partition wall 6. A lower elastic film 11 is sealingly fixed inside the lower vibration-preventing rubber member 10. The upper end of the lower elastic film 11 is vulcanized and spliced to the lower part of the hub 5 of the partition wall 6, while the lower outer end thereof is sandwiched between the fixture 19 of the lower vibration-preventing rubber member 10 and the outer end recess of the lower plate 4. The fixture 19 is caulked.

An upper damper liquid chamber 9', is comprised of an enclosure defined by the upper vibration-preventing rubber member 7, the upper elastic film 8 and the partition wall 6. A lower damper liquid chamber 12' is comprised of an enclosure defined by the lower vibration-preventing rubber member 10, the lower elastic film 11 and the partition wall 6. An orifice 13, in the partition wall 6, communicates the upper damper liquid chamber 9' with the lower damper liquid chamber 12'. A damper liquid such as coolant is tightly sealed in the chambers.

Figure 2:
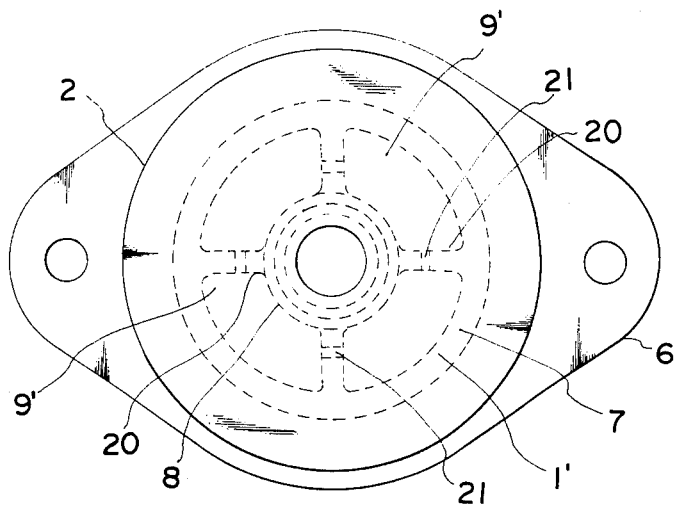
FIG. 2 is a plan view of the embodiment shown in FIG. 1.

Further, the upper damper liquid chamber 9' and the lower damper liquid chamber 12' are formed with four division plates 20 and 20', respectively. Division plates 20 extend across the upper vibration-preventing rubber member 7 and the upper elastic film 8, and division plates 20' extend across the lower vibration-preventing rubber member 10 and the lower elastic film 11 in such a manner to horizontally quarter the damper liquid chambers 9' and 12' as shown in FIG. 2. Thus, four upper damper liquid subchambers 9' and four lower damper liquid subchambers 12' are defined. Additionally, adjoining upper damper liquid subchambers 9' communicate through orifices 21 formed in the intervening division plates 20, while adjoining lower damper liquid subchambers 12' communicate through orifices 21' formed in the intervening division plates 20'.

The horizontally divided lower damper liquid subchambers 12' are not shown in FIG. 2, but the arrangement thereof is similar to upper damper liquid subchambers 9' and will be understood from the illustration of FIG. 1.

The outer peripheral parts of the partition wall 6 of the vibration-preventing device 1' are clamped to a frame 14 by bolts and nuts, and a cabin 15, placed on the upper plate 2, is fixed by a bolt and a nut inserted through the inner cylinder 3.

In the above construction, the upper vibration-preventing rubber member 7 and the lower vibration-preventing rubber member 10 support a static load applied from above, and they absorb all of the relative high-frequency and medium-frequency vertical vibrations as well as all of the relative high-frequency and medium-frequency horizontal vibrations of the frame 14 and the cabin 15.

The components of the relative low-frequency vertical vibrations are dampened by subjecting the mutual vertical flows of the damper liquid to a damping action by the orifices 13 which communicate the upper damper liquid subchambers 9' with the corresponding lower damper liquid subchambers 12'.

The components of the low-frequency relative horizontal vibrations are dampen by subjecting the flow of the damper liquid between the upper damper liquid subchambers 9' and the flow of the damper liquid between the lower damper liquid subchambers 12', to damping actions by orifices 21 (which communicate adjacent upper damper liquid subchambers 9' and 9') and orifices 21' (which communicate adjacent lower damper liquid subchambers 12' and 12'). Thus, the vibration transmission factor of these components is reduced.

Figure 3:
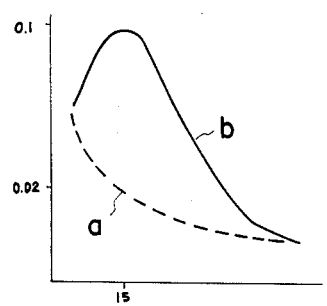
FIG. 3 is a graph showing the correlation between the damping coefficient and the frequency of horizontal vibrations.

FIG. 3 is a graph showing the correlation between the damping coefficient R of the relative horizontal vibrations, shown on the ordinate axis and the frequency [HZ] shown on the abscissa. Broken line a corresponds to the prior-art vibration-preventing device 1, while solid line b corresponds to the vibration-preventing device 1' according to this invention. The peak value of the damping coefficient of the vibration-preventing device 1' can be enlarged about 5 times as compared with the damping coefficient of the prior-art vibration-preventing device 1 at a frequency corresponding to the peak value.

Figure 4:
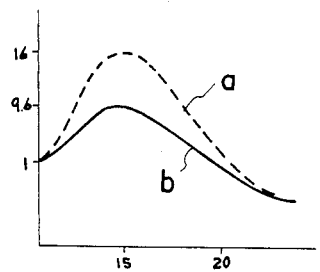
FIG. 4 is a graph showing the correlation between the vibration transmission factor and the frequency of horizontal vibrations.
Figure 5:
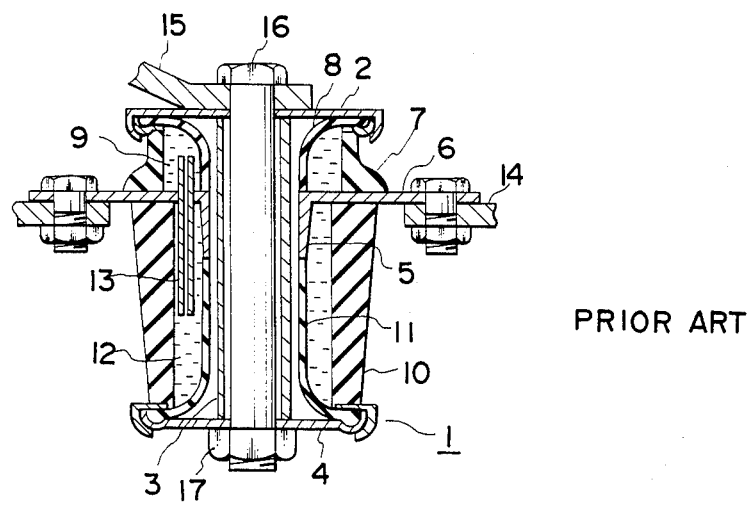
FIG. 5 is a vertical cross-sectional view corresponding to FIG. 1, showing a prior art vibration-preventing device.

FIG. 4 is a graph showing the correlation between the vibration transmission factor P of the relative horizontal vibrations, shown on the ordinate axis and the frequency [Hz], shown on the abscissa. The vibration transmission factor of the vibration-preventing device 1' according to this invention, indicated by a solid line b, can be suppressed so it is smaller than that of the prior art vibration-preventing device 1, indicated by broken line a, over the whole frequency region.

Accordingly, the vibration-preventing rubber device 1' satisfactorily absorbs and dampens all of the components of the relative high-frequency, medium-frequency and low-frequency vertical and horizontal vibrations of the frame 14 and the cabin 15. Therefore, increased riding comfort of the car is ensured, and noise inside and outside of the car is decreased.

This invention is not restricted to the foregoing embodiment, but various other aspects can be adopted. For example, the number of divisions of the upper damper liquid chamber or the lower damper liquid chamber may be increased, for example, to 6 to 8 to enhance dynamic characteristics for absorbtion of the horizontal vibrations. Moreover, the positions of the division plates of the upper and lower damper liquid chambers may be shifted in phase. Further, only one of the damper liquid chambers may be divided horizontally.

According to the invention described above, the relative high-frequency, medium-frequency and low-frequency vertical and horizontal vibrations of the frame of an automobile and a body placed and fixed on the frame are absorbed and dampened by a vibration-preventing rubber. Thus, the riding comfort of the vehicle is enhanced and the noise, inside and outside the vehicle, is reduced.

More specifically, a partition wall is interposed between an upper plate and a lower plate, an upper vibration-preventing rubber member is interposed between the partition wall and the upper plate, and a lower vibration-preventing rubber member is interposed between the partition wall and the lower plate. Thus, the relative vertical and horizontal high-frequency and medium-frequency vibrations of the frame of a vehicle and a body, are advantageously absorbed by the upper vibration-preventing rubber member and lower vibration-preventing rubber member.

In addition, an upper damper liquid chamber formed on the upper side of the partition wall and a lower damper liquid chamber formed on the lower side of the partition wall communicate through orifices, thereby beneficially providing that the vertical flow of a damper liquid between the upper damper liquid chamber and the lower damper liquid chamber undergoes the damping action of the orifices, thus damping the relative vertical vibrations in a low-frequency region.

Further, either or both of the upper damper liquid chamber and lower damper liquid chamber is horizontally divided by division plates into a plurality of damper liquid subchambers. The damper liquid subchambers adjoining each other communicate through another orifice, thereby beneficially providing that the flow of the damper liquid between adjacent damper liquid subchambers undergoes damping of the orifice, so the low-frequency horizontally vibrations are satisfactorily damped.

Accordingly, the vibration-preventing rubber device satisfactorily dampens and absorbs vibrations for all components of the relative vertical and horizontal vibrations of the frame and the body. Thus, the vibration transmission from the frame to the body is reduced thereby enhancing the riding comfort of the vehicle.

Also, by reducing the vibrations of the body, the device reduces the noise ascribable to these vibrations.

While the preferred embodiment of the present invention has been described, it is to be understood that the invention is not limited thereto, and may be otherwise embodied within the scope of the following claims.

What is claimed is:

1. A vibration-preventing device comprising:
   an inner cylinder;
   an upper plate;
   a lower plate;
   a partition wall positioned outside said inner cylinder and interposed between said upper plate and said lower plate, said upper plate and said lower plate being connected to said inner cylinder;
   an upper vibration-preventing rubber member interposed between said partition wall and said upper plate;
   an upper elastic film disposed between said upper vibration-preventing member and said inner cylinder;
   an upper damper liquid chamber being defined by said upper vibration-preventing rubber member, said partition wall and said upper elastic film;
   a lower vibration-preventing rubber member interposed between the partition wall and the lower plate;
   a lower elastic film disposed between said upper vibration-preventing members and said inner cylinder;
   a lower damper liquid chamber being defined between said partition wall, said lower elastic film and said lower vibration-preventing rubber member; and
   a first orifice, said upper damper liquid chamber communicating with said lower damper liquid chamber through said first orifice, at least one of said upper damper liquid chamber and said lower damper liquid chamber being horizontally divided into a plurality of damper liquid subchambers by rubber division plates, said division plates being integral with one of said vibration-preventing rubber member and connected with at least one of said upper and lower elastic films, adjacent ones of said damper liquid subchambers communicating directly with each other through additional orifices horizontally located in said each division plate.

2. The vibration-preventing device according to claim 1, wherein said upper damper liquid chamber is formed with said plurality of damper liquid subchambers.

3. The vibration-preventing device according to claim 1, wherein said lower damper liquid chamber is formed with said plurality of damper liquid subchambers.

4. The vibration-preventing device according to claim 1, wherein both said upper damper liquid chamber and said lower damper liquid chamber are formed with said plurality of damper liquid subchambers.

5. The vibration-preventing device according to claim 4, wherein said division plates for dividing said upper damper liquid chamber and said division plates for dividing said lower damper liquid chamber are formed so as to have a peripheral phase shift therebetween.

6. The vibration-preventing device of claim 1 wherein said additional orifices extend through said division plate in a direction which is skew with respect to the axis of said inner cylinder.

* * * * *